United States Patent
Allen et al.

(10) Patent No.: US 6,428,705 B1
(45) Date of Patent: *Aug. 6, 2002

(54) PROCESS AND APPARATUS FOR HIGH FLOW AND LOW PRESSURE IMPURITY REMOVAL

(75) Inventors: Stephen D. Allen, Boise, ID (US); Josh H. Golden, Santa Cruz, CA (US)

(73) Assignee: Microbar Incorporated, Sunnyvale, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 09/688,898

(22) Filed: Oct. 16, 2000

Related U.S. Application Data (63) Continuation-in-part of application No. 09/651,807, filed on Mar. 30, 2000, now Pat. No. 6,312,601, which is a continuation of application No. 09/327,781, filed on Jun. 7, 1999, now abandoned, which is a division of application No. 08/965,574, filed on Nov. 6, 1997, now Pat. No. 5,965,027, which is a continuation-in-part of application No. 08/756,681, filed on Nov. 26, 1996, now Pat. No. 5,871,648.

(51) Int. Cl.$^7$ .............................. C02F 1/44; C02F 1/56
(52) U.S. Cl. ..................... 210/638; 210/639; 210/651; 210/652; 210/728; 210/734; 210/735
(58) Field of Search .................... 210/638, 639, 210/650, 651, 652, 728, 734, 735, 911, 912, 915

(56) References Cited

U.S. PATENT DOCUMENTS

| | | | |
|---|---|---|---|
| 1,324,118 A | 12/1919 | Hottinger et al. | 210/702 |
| 3,075,645 A | 1/1963 | Riddick | 210/197 |
| 3,097,163 A | 7/1963 | Riddick | 210/53 |
| 3,101,317 A | 8/1963 | Starry | 210/52 |
| 3,521,752 A | 7/1970 | Lindman | 210/56 |
| 3,544,476 A | 12/1970 | Aiba et al. | 252/175 |
| 4,016,075 A | 4/1977 | Wilkins | 210/42 R |
| 4,145,282 A | 3/1979 | Bruckenstein | 210/46 |
| 4,188,291 A | 2/1980 | Anderson | 210/652 |
| 4,207,183 A | 6/1980 | Herrigel | 210/651 |
| 4,246,102 A | 1/1981 | Hjelmner et al. | 210/704 |
| 4,260,493 A | 4/1981 | Kretas et al. | 210/714 |
| 4,276,180 A | 6/1981 | Matson | 210/683 |
| 4,420,401 A | 12/1983 | Kretas et al. | 210/714 |
| 4,450,057 A | 5/1984 | Kelly | 204/98 |
| 4,504,356 A | 3/1985 | Mülder et al. | 162/29 |
| 4,731,187 A | 3/1988 | Moriya et al. | 210/719 |
| 4,765,906 A | 8/1988 | Downing et al. | 210/636 |
| 4,765,913 A | 8/1988 | Featherstone | 210/714 |
| 4,780,211 A | 10/1988 | Lion | 210/644 |
| 4,938,876 A | 7/1990 | Ohsol | 210/708 |
| 4,957,634 A | 9/1990 | Bowers, Jr. | 210/711 |

(List continued on next page.)

OTHER PUBLICATIONS

S. A. Wasay, B. K. Puri and I. Haq, "Removal of Trace Heavy Metals by Metal Chelates", *Intern. J. Environmental Studies*, vol. 36, pp. 191–197 (1990).

G.B. Harris and S. Monette, "The Stability of Arsenic–Bearing Residues", presented at TMS–AIME Symposium, pp. 1–20 (Jan. 25–29, 1988).

(List continued on next page.)

*Primary Examiner*—Ernest G. Therkorn
(74) *Attorney, Agent, or Firm*—Madson & Metcalf (57) ABSTRACT

A process for removing contaminants from large volumes of wastewater is disclosed. The process involves treating a wastewater stream containing the contaminant with a coagulant that reacts with the contaminant to form a particulate or aggregate of particulates having a size greater than 10 $\mu$m. The treated wastewater is passed through a microfiltration membrane having a pore size in the range from 0.5 $\mu$m to 10 $\mu$m at low pressure (less than 20 psig) to remove the contaminant. Under such conditions, the treated wastewater flux rate is greater than 200 gallons per square foot of membrane per day ("GFD"), and typically from 200 to 1500 GFD.

21 Claims, 4 Drawing Sheets

U.S. PATENT DOCUMENTS

| | | | |
|---|---|---|---|
| 5,043,072 A | 8/1991 | Hitotsuyanagi et al. | 210/638 |
| 5,071,587 A | 12/1991 | Perman | 210/730 |
| 5,078,900 A | 1/1992 | Wegner | 210/638 |
| 5,108,620 A | 4/1992 | Wester et al. | 210/725 |
| 5,164,095 A | 11/1992 | Sparapany et al. | 210/735 |
| 5,171,453 A | 12/1992 | Communal | 210/725 |
| 5,182,023 A | 1/1993 | O'Conner | 210/652 |
| 5,205,939 A | 4/1993 | Syrinek | 210/727 |
| 5,246,686 A | 9/1993 | Cuer et al. | 423/467 |
| 5,320,773 A | 6/1994 | Perman | 210/730 |
| 5,403,495 A | 4/1995 | Kust et al. | 210/710 |
| 5,415,782 A | 5/1995 | Dimas | 210/698 |
| 5,453,206 A | 9/1995 | Browne | 210/711 |
| 5,510,040 A | 4/1996 | Miller | 210/912 |
| 5,512,181 A | 4/1996 | Matchett | 210/649 |
| 5,556,545 A | 9/1996 | Volchek | 210/651 |
| 5,575,915 A | 11/1996 | Nakamura | 210/651 |
| 5,605,633 A | 2/1997 | Nakumura | 210/732 |
| 5,609,765 A | 3/1997 | Bowman | 210/651 |
| 5,620,629 A | 4/1997 | Salmen et al. | 252/180 |
| 5,824,227 A | 10/1998 | Cargnel et al. | 210/713 |
| 5,871,648 A | 2/1999 | Allen et al. | 210/638 |
| 5,900,220 A | 5/1999 | Allen | 423/179 |
| 5,904,853 A | 5/1999 | Allen et al. | 210/638 |
| 5,910,251 A | 6/1999 | Allen et al. | 210/638 |
| 5,965,027 A | 10/1999 | Allen et al. | 210/638 |
| 6,059,978 A | 5/2000 | Pacifici et al. | 210/727 |

OTHER PUBLICATIONS

T. Tetsumi, M. Sumi, M. Tanaka and T. Shono, "Direct Reaction of Metal Powders with Several Sodium Dithiocarbamates", *Polyhedron* vol. 5, pp. 707–710 (Sep. 2, 1985).

T. Tetsumi, M. Sumi, M. Tanaka and T. Shono, "Reaction of Copper Powder with Tetraalkylthiuram Disulphides", *Polyhedron*, vol. 4, pp. 1439–1442 (Feb. 6, 1985).

Stanislav Miertus and Vladimir Frecer, "Theoretical Study of the Electron Structure and Properties of Dithiocarbamates and their Complexes with Transmition Metals", *Collection Czechoslavak Chem. Commun.*, vol. 49, pp. 2744–2750 (1984).

R. R. Scharfe, V.S. Sastri and C. L. Chakrabarti, "Stability of Metal Dithiocarbamate Complexes", *Analytical Chemistry*, vol. 45, 413–415 (Feb. 1973).

Serge J. Joris, Keijo I. Aspila, and Chuni L. Chakrabarti, "On the Monobasic or Dibasic Character of Dithiocarbamic Acids", *Analytical Chemistry*, vol. 41, pp. 1441–1445 (Sep. 1969).

Keijo I. Aspila, Vedula S. Sastri and Chuni L. Chakrabarti, "Studies on the Stability of Dithiocarbamic Acids", *Talanta Review*, vol. 16, pp. 1099–1102 (Feb. 19, 1969).

Adam, Hulanicki, "Complexation Reactions of Dithiocarbamates", Talanta Review, vol. 14, pp. 1371–1392 (May 24, 1967).

M. J. Janssen, "The Stability Constants of Metal Complexes of Some N–Dialkyldithiocarbamic Acids—Part II. Copper Complexes in Ethanol/Water Mixtures of Various Compositions", *Recueil*, vol. 76, pp. 827–835 (1957).

M. J. Janssen, "The Stability Constants of Metal Complexes of Some N–Dialkyldithiocarbamic Acids—Part I. Cooper Complexes in 75 % ($^v/_v$) Ethanol Water", *Recueil*, vol. 75, pp. 1411–1422 (1956).

PROCESS AND APPARATUS FOR HIGH FLOW AND LOW PRESSURE IMPURITY REMOVAL

RELATED APPLICATIONS

This application is a continuation-in-part of U.S. application Ser. No. 09/651,807, now U.S. Pat. No. 6,312,601, filed Aug. 30, 2000 which is a continuation of U.S. application Ser. No. 09/327,781 filed Jun. 7, 1999, now abandoned, which is a division of U.S. application Ser. No. 08/965,54 filed Nov. 6, 1999, now U.S. Pat. No. 5,965,027, which application is a continuation-in-part of U.S. application Ser. No. 08/756,681 filed Nov. 26, 1999, now U.S. Pat. No. 5,871,648, which applications and patents are incorporated herein by reference.

FIELD OF THE INVENTION

The present invention involves the treatment and purification of wastewater at high flow rates (gallons per minute, gpm), low pressures (psig), and high flux values (gallons/$ft^2$/day, GFD). Specifically, the present invention relates to the process and apparatus for removing metals and other inorganic and organic contaminants from large volumes of wastewater in a single pass. The process and apparatus are particularly useful to effect the separation of contaminants to a level that the effluent meets specified regulatory standards for discharged water compliance. Additionally, the effluent from the system may meet or exceed those requirements for use as gray-water or for feed to a reverse osmosis system. In particular, the process and apparatus in this invention are useful for the treatment of municipal and industrial wastewaters.

BACKGROUND OF THE INVENTION

Many manufacturing operations generate large quantities of water containing heavy metals and other inorganic and organic contaminants. These industries include, but are not limited to, agriculture, petroleum, chemical, pharmaceutical, mining, metal plating, metal finishing, textile, pulp/paper, brewing, beverage, distilling, food processing, and semiconductor industries. These industries are strictly regulated with regards to the level of contaminants in their discharged wastewater. This is a result of the toxicity problems caused by the contamination of waterways by heavy metals, suspended solids, and organic materials. Strict discharge limits have been adopted for heavy metal contaminants deemed harmful to humans and aquatic organisms, and include cadmium, chromium, copper, lead, mercury, nickel, zinc, and semi-metals such as arsenic and selenium. Discharge limits also exist in many other industries. Discharge of wastewater containing large amounts of suspended solids is also harmful to ecosystems due to silting and the decrease in available light for photosynthesis.

One example is the large volumes of arsenic bearing waters generated by the mining industry. Mining draw-down wells which are used to de-water deep mining operations can generate up to 75,000 gpm (gallons per minute) of water and may contain up to 400 ppb (parts per billion) of arsenic. Additionally, it has been recognized that many potable water sources are contaminated with unacceptable levels of arsenic and may represent a serious health risk. The current maximum contaminant level (MCL) imposed by the EPA is 50 ppb, but is expected to decrease to somewhere in the range of 2 to 20 ppb in the year 2000. Because of the large volumes of water generated by both mining operations and contaminated wells, there is a need for arsenic treatment systems that can handle high flows of contaminated water.

Another example is the wastewater streams generated by the semiconductor industry. In the fabrication of integrated circuits (IC), chemical-mechanical polishing (CMP) is an essential process used to reduce topological defects. Because defect reduction is especially critical in the production of new generation ICs, the use of CMP slurries is expected to grow at a greater rate than any other integrated circuit manufacturing category. Until recently, CMP wastewater was not a major issue. However, as the volume of CMP wastewater increases, typical acid waste neutralization systems at IC manufacturing operations are not capable, nor are they equipped, to treat the high levels of suspended solids, fluoride, and heavy metals found in CMP wastewater. Flow rates from CMP operations typically range from 10 to 500 gpm. To effectively meet the new regulatory challenges and the safe treatment of CMP wastewater, it is imperative to develop a simple and robust wastewater treatment system.

Semiconductor, hydrocarbon refining, and other manufacturing processes may also generate large quantities of fluoride ions that must be removed from wastewater. Various processes have been proposed, with only marginal success, for removing fluoride from wastewater. Such processes include treatment with calcium, magnesium, phosphate, and/or aluminate.

Yet another example is the large quantities of water containing dyes from many industrial dyeing operations, such as pulp, paper, fiber, and textile dyeing processes. For example, textile mills can generate millions of gallons of dye wastewater every day. The dyes and other organic compounds found in such effluent wastewater steams rarely conform to governmental standards restricting color value, biological oxygen demand (BOD), and chemical oxygen demand (COD) of industrial discharge.

A further example is the large quantities of wastewater from food processing operations, including meat and poultry feedlots and processing operations. Wastewater from these operations may contain organic and inorganic contaminants to be removed prior to environmental discharge. Such wastewater may also contain biological contaminants.

In general, a variety of processes have been proposed to reduce contaminants in industrial wastewater to meet the increasingly stringent discharge limits. These include large settling ponds, clarifiers, and sand filter systems utilizing inorganic coagulants, lime, and large quantities of high molecular weight polymer additives. Although such systems are typically able to achieve 90% compliance with regards to discharge regulations, many metal and non-metal contaminants cannot be safely discharged into the environment unless their concentration is much less than 0.5 ppm (parts per million). For example, if influent arsenic levels are greater than 300 ppb, clarifier/gravity settling and sand filter systems are not able to consistently provide discharge levels less than 50 ppb. Likewise, effective removal of suspended solids via gravity settling schemes rely on high doses of lime and high molecular weight anionic polymer flocculants. These systems are susceptible to upsets due to varying effluent composition, which results in failures to meet regulatory compliance. In addition, system maintenance is extensive, and large land areas (footprint) are required for the system installation.

Microfiltration has been considered to remove heavy metals and suspended solids from wastewater. One example, cross-flow microfiltration, typically operates at 25 to 75 psig or greater, and may yield a flux ranging from 10–150 GFD. Because of the low flux and the constant recycle and reconcentration mode of the apparatus, cross-flow filtration is typically unable to process very large amounts of wastewater. For example, at a flux of 150 GFD, it would be necessary to have at least 24,000 square feet of membrane to process 2,500 gpm of wastewater. If the wastewater flow rate were 7,500 gpm, then the membrane size would need to be at least 72,000 square feet. Because it would take a very large number of costly cross-flow membranes to process these high flow rates, the system in turn would be prohibitively large and expensive. An additional drawback of cross-flow filtration is the need to use high pressure to force the water through the membranes. High pressure operation results in increased maintenance costs, the need for larger capacity pumps, increased power consumption, and increases the potential to "blind" or foul the membranes with particles. Finally, cross-flow systems are inherently inefficient because the reject water stream must go through multiple passes or recirculation cycles before the water is completely treated.

Because of the shortcomings of both gravity settling/clarifier and cross-flow filtration schemes, it would be a significant advancement in the art to provide a process and system for removing metals and other contaminants from large quantities of wastewater, at low pressure (<25 psig) and a high flux (>200 GFD).

It would also be a major advancement in the art to provide a process and microfiltration system for removing metals and other inorganic and organic contaminants from large quantities of wastewater in which relatively simple and inexpensive membranes are used.

It would also be a major improvement in the art to provide a process and system for removing metals and other inorganic and organic contaminants from large quantities of wastewater in which over 99% of the wastewater is treated in a single pass, without the need for recirculation.

It would also be a major advancement in the art to provide a process and microfiltration system for removing metals and other inorganic and organic contaminants from large quantities of wastewater that do not require a large footprint.

Finally, it would also be an important advancement in the art to provide a process and system for removing metals and other inorganic and organic contaminants from large quantities of wastewater that consistently complies with environmental discharge requirements.

Finally, it would be a significant improvement in the art for an effective process for removing dyes and organic biological, agricultural, and food processing contaminants from wastewater.

Such processes and systems are disclosed and claimed herein.

SUMMARY OF THE INVENTION

The present invention is directed to a process and apparatus for removing metals and other inorganic and organic contaminants from large volumes of wastewater. In the process, a wastewater stream containing the contaminants is pretreated with one or more chemical coagulants of a specific nature and molecular weight. As used herein, the term "chemical coagulants" includes inorganic and organic coagulants and higher molecular weight organic flocculants. The chemical pretreatment results in the formation of non-tacky and easily filterable particles that are especially well suited for low-pressure microfiltration. After pretreatment, the particles are filtered using an array of inexpensive sock filters at a differential pressure of less than 25 psig. The clean water flows out the top of the filter tank containing the membrane array, and it is collected for recycling or safe discharge.

After a certain period of time or after a preset pressure is reached, the filter cake that is formed on the membrane surface is removed by a gravity back-flush of less than 5 psig. After a short waiting period, during which time the sludge is removed, the process is repeated automatically. In this fashion, over 99% of the wastewater is treated in a single pass. Finally, because the particle size (>10 $\mu$m) is much greater than the membrane pore size (0.5 to 10 $\mu$m), low pressures (3 to 25 psig, more preferably 5 to 20 psig) and high flux values (200 GFD to greater than 1,500 GFD) are easily achieved.

Contaminants treated by the low-pressure microfiltration system include transition metals, semi-metals, and many main group elements. Examples of such contaminants include, but are not limited to, the oxide, hydroxide, sulfide, and/or elemental form of the following: beryllium (Be), magnesium (Mg), aluminum (Al), silicon (Si), phosphorus (P), sulfur (S), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), arsenic (As), selenium (Se), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), barium (Ba), lanthanides (lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb)), hafnium (Hf), tantalum (Ta), tungsten (W), rhenium (Re), osmium (Os), iridium (Ir), platinum (Pt), gold (Au), mercury (Hg), thallium (Tl), lead (Pb), and bismuth (Bi); fluoride ($F^-$), phosphate ($PO_4^{3-}$), alumina ($Al_2O_3$), and silica ($SiO_2$). As used herein, the term "contaminants" also includes organic compounds such as aliphatic, aromatic, and heteroaromatic hydrocarbons, dyes, agricultural waste, biological waste, food waste, and other industrial waste stream foulants. Charged organic materials may also be absorbed and removed. In general, the present invention can be readily adapted for removing a variety of inorganic and some organic contaminants found in wastewater, by using suitable chemical or physiochemical pretreatment.

Known and novel chemical coagulants, including flocculants, useful for pretreatment are available to achieve the desired particle formation in the pretreatment step. For example, ferric sulfate, ferric chloride, ferrous sulfate, aluminum sulfate, sodium aluminate, polyaluminum chloride, and aluminum trichloride are well known inorganic coagulants. Organic polymeric coagulants and flocculants can also be used, such as polyacrylamides (cationic, nonionic, and anionic), EPI-DMA's (epichlorohydrin-dimethylamines), DADMAC's (polydiallydimethyl-ammonium chlorides), dicyandiamide/formaldehyde polymers, dicyandiamide/amine polymers, natural guar, etc. The stoichiometric ratio of coagulant to metal or non-metal contaminant is preferably optimized to result in acceptable contaminant removal at minimum coagulant cost.

The required coagulant concentration will depend on several factors, including metal contaminant influent concentration, wastewater flow rate, coagulant/contaminant reaction kinetics, metal contaminant effluent compliance requirement, etc. In general, for waste streams containing heavy metals, suspended solids, and organic materials, the chemical coagulant dosage can range from 2 to 500 ppm of active solids. The rather broad range in coagulant dosage is due to the constant variation of contaminant composition in wastewater streams, which also vary widely from origin to origin. As used herein, the term "active solids" refers to the active material (such as the coagulant) in the solution or suspension (such as the wastewater stream). Thus, a chemical coagulant dosage of 10 ppm of active solids means that a sufficient amount of the active chemical coagulant is added to the wastewater to result in a concentration of 10 ppm of the active chemical coagulant material. A typical inorganic coagulant dosage may range from 10 to 300 ppm of active solids. A typical organic coagulant dosage may range from 2 to 500 ppm of active solids. A typical high molecular weight chemical coagulant (flocculant) dosage may range from 2 to 150 ppm of active solids.

Extra care must be taken to remove complexed metals. For example, some transition metals such as copper form soluble complexes with ammonia, citric acid, and ethylenediamine tetraacetic acid (EDTA), and other complexing agents. In these cases, it may be desirable to add a metal removal agent to "defeat" or break these complexes, which then renders the metal insoluble. The metal-containing precipitate thus formed is then absorbed by the coagulant(s), or the metal containing precipitate by itself may be suitable for microfiltration.

Furthermore, the system is not restricted to the use of chemical coagulants for the pretreatment step. Oxidizing agents (such as ozone, peroxide, permanganate, hypochlorite salts, etc.), reducing agents (such as sodium bisulfite, sodium borohydride, etc.), electrolysis, and other methods may be suitable to create large filterable particles. Additionally, oxidation processes may destroy complexing agents that solublilize metals, thereby making the metals easier to remove. Oxidizing agents also destroy organic materials or aid in the formation of charged organic materials, which are easier to remove by coagulation. Although the aforementioned pretreatment processes are typically used in concert with coagulant pretreatment, these processes may alone create large filterable particles suitable for filtration.

After pretreatment, the wastewater is passed through an array of microfiltration membranes that physically separate the contaminants from the wastewater. Suitable and relatively microfiltration membranes are commercially available from manufacturers such as W. L. Gore, Koch, and National Filter Media. For instance, one Gore-Tex® membrane used in the present inyvntion is made of polypropylene felt with a sprayed coating of Teflon®. The Teflon® coating is intended to promote water passage through the membrane. Such microfiltration membrane material has been found to be useful for many wastewater treatment systems. However, when used in a system for removing fluoride or silica, without a pretreatment step, it has been observed that the coagulated particles adhere to the exterior and interior surface and plug the membrane. Back-flushing was not effective in such cases.

The microfiltration membranes are preferably used in a tubular "sock" configuration to maximize surface area. The membrane sock is placed over a slotted support tube to prevent the sock from collapsing during use. To achieve the high flow rates and flux values, a number of membranes or membrane modules, each containing a number of individual filter socks, are preferably used.

The microfiltration membranes preferably have a pore size in the range from 0.5 $\mu$m to 10 $\mu$m. By controlling the ratio of coagulant to the contaminant, 99.9% of the precipitated contaminant particles can be greater than 5 microns in diameter, and preferably greater than 10 $\mu$m. This allows the use of larger pore size microfiltration membranes. It has been found that the treated wastewater flux rate through 0.5 to 1 $\mu$m microfiltration membranes can be in the range from 200 GFD to 1500 GFD.

Solids are preferably removed from the membrane surface by periodically back-flushing the microfiltration membranes and draining the filtration vessel within which the membranes are located. The periodic, short duration back-flush removes any buildup of contaminants from the walls of the microfiltration membrane socks. Back-flush is achieved but is not restricted to a gravity scheme, i.e., one in which a valve is opened and the 1 to 2 feet of water headspace above the filter array provides the force that sloughs off the filter cake. The dislodged solid material within the filtration vessel is then transferred into a sludge holding tank for further processing of the solids.

The microfiltration as described is preferably fully automated and can run 24 hours, seven days a week, with minimal input from the operator. The system is completely automated using process logic control (PLC) that can communicate with supervisory and control data acquisition systems (SCADA). Simple and rugged hardware continuously monitors the characteristics of the influent and effluent and adjusts the chemical feed as needed. Examples of parameters automatically monitored include pH, turbidity, oxidation-reduction potential, particle zeta potential, and metal contaminant concentration. Process development and fine-tuning is achieved by continuous monitoring of the process parameters followed by control adjustment. The data can be automatically downloaded for storage and analysis via hard-line, phone, wireless, intranet, Internet, or similar electronic connection.

The present invention includes a process for removing dyes from large volumes of wastewater. In the process, a wastewater stream containing dye is treated with one or more oxidizing agents to at least partially destroy the dye. The wastewater stream is further treated with an organic polymer coagulant that reacts with the partially destroyed dye to form a dye particulate. The particulate has a size greater than about 10 $\mu$m, more typically greater than 50 $\mu$m. In practice, the particulate size is preferably larger, in the range from about 250 to 300 $\mu$m. The wastewater is then passed through a microfiltration membrane as described above.

Although a variety of known oxidizing agents can be used as a pretreatment in dye destruction and removal in accordance with the present invention, currently preferred oxidizing agents include hydrogen peroxide, ozone, hypochlorite salts, and ultraviolet (UV) light. These are preferred for their low cost, availability, and effectiveness. A combination of ozone and either hydrogen peroxide or UV light has been found effective. Commercially available hydrogen peroxide, having a concentration in the range from about 2% to 50% can be used. A variety of polymeric coagulants may be used, such as DADMAC's, EPI-DMA's, polyacrylamides, polymeric dicyandiamide formaldehydes, polymeric dicyandiamide amines, and guanyl polymers. Low molecular weight polymers having a molecular weight greater than 5000 and less than 1,000,000 are currently preferred.

The present invention may be used in the food processing industry, including meat and poultry processing applications that generate large quantities of suspended organic solids, fats, coliform bacteria, and other organic foulants. Wastewater from such operations is treated with one or more oxidizing agents to partially destroy the organic foulants. The wastewater stream is further treated with a coagulant and/or flocculant to form filterable particulates having a size greater than 10 μm. The wastewater is then passed through a microfiltration membrane as described above. The effluent thus obtained is suitable for discharge to the local POTW, and is free of pathogens.

In summary, there are several general applications of the impurity removal process and apparatus within the scope of the present invention, some of which are described below:

The present invention can be used to remove colloidal or suspended solids from wastewater. The wastewater feed can be of any nature, e.g., natural and partially treated waters, domestic and industrial wastewaters, sludges from the treatment of waters and of domestic and industrial wastewaters, sludges arising directly from industrial processes, and spoil or slurries arising from operations such as dredging, and thickening of sludges. The separation is not restricted to, but preferentially achieved using a pretreatment technique, such as coagulation and flocculation.

The present invention can be used separate biomass and sludges from wastewater in reactors, including aerobic, anoxic, or anaerobic reactors. In an activated sludge plant in which the reactor is aerobic, the biomass (activated sludge) can be separated from the flow of mixed liquor (biomass plus wastewater) using the microfiltration system instead of by sedimentation. Because of the slow rate of settling of biomass by sedimentation, the use of the present invention can greatly increase the concentration of biomass in the reactor(s), from 4000 mg/L to 20,000 mg/L or more. As the minimum residence time and the size of the reactor(s) required to achieve a given performance is roughly inversely proportional to the concentration of biomass, the capital cost of the reactor(s) can be greatly reduced. It is believed that the filter can cost less than the sedimentation tank. In addition, the permeate quality can be better than obtained from a conventional activated-sludge plant and may be equivalent to or better than that of a conventional plant when treated by coagulation, settlement, and sand filtration. The power input may be higher, but the corresponding increase in cost is less than the saving otherwise achieved.

The present invention can be used as a pretreatment of industrial wastewaters prior to final treatment in carbon or ion beds, and/or reverse osmosis systems. Essentially, the system is for the removal of suspended solids, colloidal particles, and some organic foulants from waters, wastewaters, and industrial effluents, e.g. from textiles, pulp and paper, sugar, chemicals, tanning, mining, beverages, brewing, distilling, food, fermentation, oil refineries, pharmaceuticals, and other processing industries.

The present invention can also be used to filter suspended solids with poor settling characteristics. The system can serve as a substitute for, and improvement upon, sedimentation or other separation devices in reactor systems, depending upon the separation and recycling of solids, biomass or other materials, e.g. in various forms of aerobic, anoxic, or anaerobic fermentor for wastewater treatment or general fermentation, or other biological and biochemical processes.

DETAILED DESCRIPTION OF THE INVENTION

The present invention is directed to a process for removing inorganic and some organic contaminants from large volumes of wastewater. In typical operation, the wastewater is collected and pretreated with one or more chemical coagulants, so that the contaminants react with the coagulant (s) to form particles having a size greater than about 5 μm and preferably greater than 10 μm. The chemical coagulants are preferably mixed with the wastewater using reaction vessels or static in-line mixers, although other mixing methods can be used.

The treated wastewater is then passed through microfiltration membranes having a pore size in the range from 0.5 μm to 10 μm to remove the contaminant particulates. In such a system, wastewater flux rates in the range from 200 GFD to 1500 GFD are possible. Flow rates typically range from 2 to 50,000 gpm, or greater. More commonly, the flow rates range from 10 to 10,000 gpm. The microfiltration membrane is periodically back-flushed to remove the solids from the membrane surface. The rejected solids are gravity collected at the bottom of the filter vessel and time or pressure cycle discharged to a settling tank for further sludge processing.

The microfiltration membranes are preferably provided in cassette or module or in a preformed plate containing the membrane array. In either case, the membranes are conveniently installed or removed from the top by unscrewing a collar fitting. Alternatively, the entire cassette or plate may be removed for servicing. The microfiltration membranes provide a positive particle separation in a high recovery dead head filtration array. The dead head filtration operates effectively at low pressures (3 psi to 25 psi, preferably 5 psi to 20 psi, and more preferably 5 to 10 psi) and high flow rates, allowing a one pass treatment with up to 99.9% discharge of the supplied water. Solids which accumulate on the membrane surface during filtration are periodically back-flushed away from the membrane surface to ensure a continuously clean filtration media. The back-flushed solids settle by gravity for subsequent removal and processing.

Currently, the preferred filter socks useful with the present invention contain a Teflon® coating on a poly(propylene) or poly(ethylene) felt backing material. Such socks are available from W. L. Gore. Another presently preferred filter sock manufactured by National Filter Media, Salt Lake City, Utah, consists of a polypropylene woven membrane bonded to a poly(propylene) or poly(ethylene) felt backing. Because the membranes are simple and inexpensive, some operations deem it more cost-effective to replace the membrane socks instead of cleaning contaminants from the membrane. However, it should be noted that the membranes are very resistant to chemical attack from acids, alkalis, reducing agents, and some oxidizing agents. Descaling of the membranes is achieved by acid washing, while removal of biofouling may be accomplished by treatment with hydrogen peroxide, dilute bleach, or other suitable agents.

The membrane life is important to the continuous operation and operational cost of the filtration system. The membranes manufactured by W. L. Gore and National Filter Media, Salt Lake City, Utah typically have a 2 to 4 year life with no catastrophic failures in industrial conditions at a temperature of 160° F. and a pH greater than 13. Because the filtration system operates at low pressures, preferably below 25 psi, and more preferably between 5 and 20 psi, filter life is greatly extended. It is expected that membranes used according to the present invention will have a life greater than 24 months.

Anticipated operating conditions for the present invention are ambient temperature and pH values between 2 and 11, and more typically between 5 and 11. For heavy metal removal, the pH is usually greater than 7, but not lower than 5. It can be as high as pH 10 or 11. For arsenic removal, the pH is preferably from 5 to 8. For silica and alumina, the pH is preferably less than 9 to minimize soluble silica and alumina, and more preferably between pH 6 and 9, and optimally between pH 7 and 8.

Figure 1:
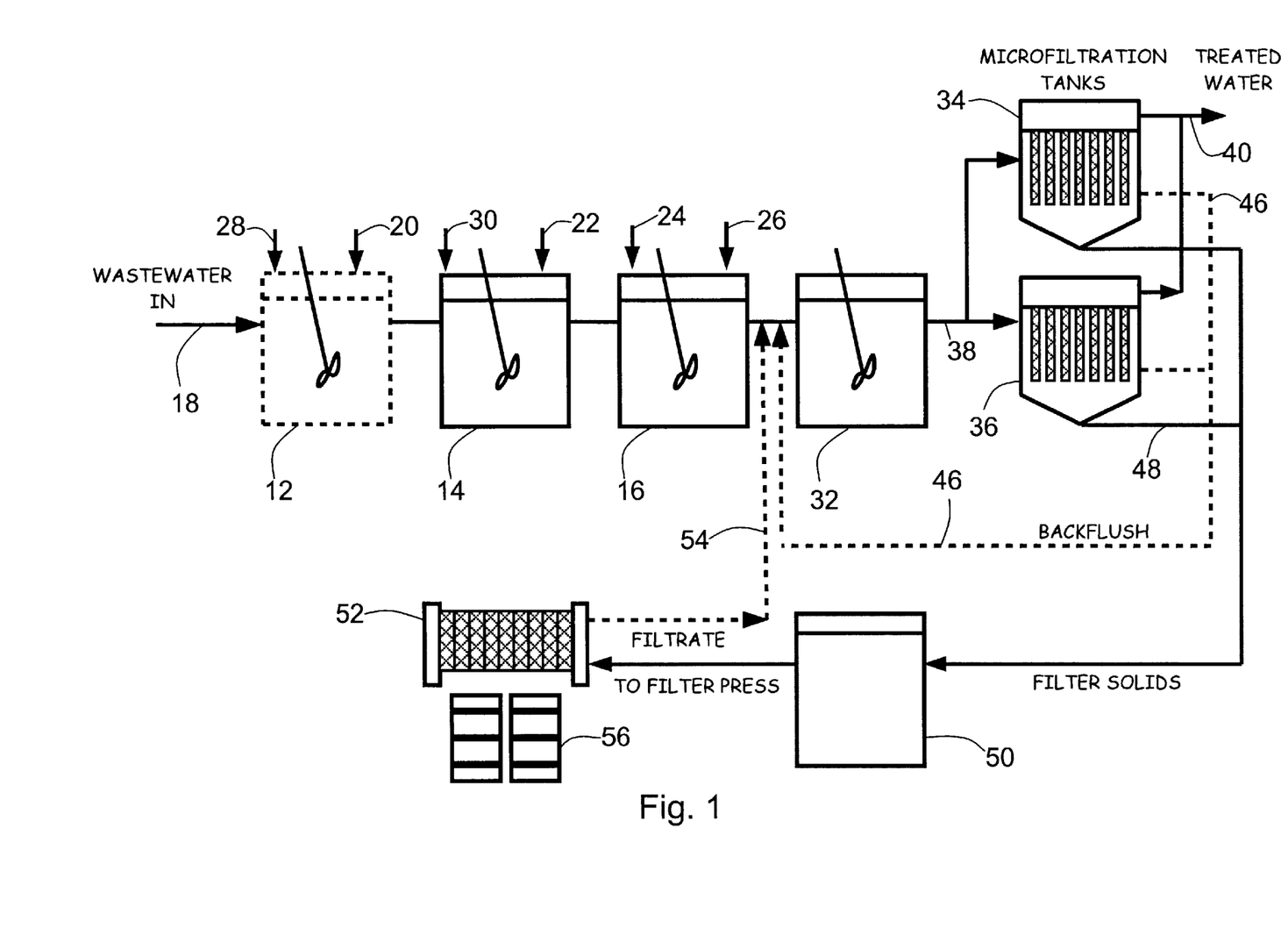
FIG. 1 is a schematic representation of one wastewater microfiltration apparatus for high flow impurity removal.

Reference is made to FIG. 1, which illustrates one possible wastewater microfiltration apparatus 10 for high flow impurity removal. The apparatus optionally includes a plurality of pretreatment reactor vessels 12, 14, and 16 that enable the wastewater feed stream 18 to chemically react with one or more chemical coagulants, oxidizing agents, and/or reducing agents. The pretreatment reactor vessels can also be adapted for treating the wastewater feed stream in non-chemical ways, such as electrolysis.

Chemical coagulants, oxidizing agents, and/or reducing agents, which react with contaminants in the wastewater feed stream 18, are introduced into the pretreatment reactor vessels via chemical feed streams 20, 22, 24, and 26. The pH within the pretreatment reactor vessels is preferably monitored with a pH sensor, not shown. Acid or base can be added to the pretreatment reactor vessels, if necessary, to adjust the pH via acid/base feed streams 28 and 30. The number of pretreatment reactor vessels can vary depending on the number of chemical coagulants being used and the reaction chemistry used to form the waste particulates. The size of the reactor vessels can be varied to provide different reaction times.

After flowing through the necessary pretreatment reactor vessels, the wastewater feed stream flows into a feed/surge tank 32 for holding the pretreated wastewater. The pretreated wastewater is directed to one or more microfiltration vessels 34 and 36 via filtration vessel feed stream 38. The size of feed stream 38 will depend on the designed flow rate of the filtration vessel. For example, in a system having 5 filtration vessels, each handling 2500 gpm, a 24-inch feed line to the system is suitable. Each filtration vessel 34 and 36 is a stand-alone filtration device. The number and size of each filtration vessel can vary depending on the system capacity requirements. The filtrate is removed from each filtration vessel via a filtrate stream 40.

Figure 2:
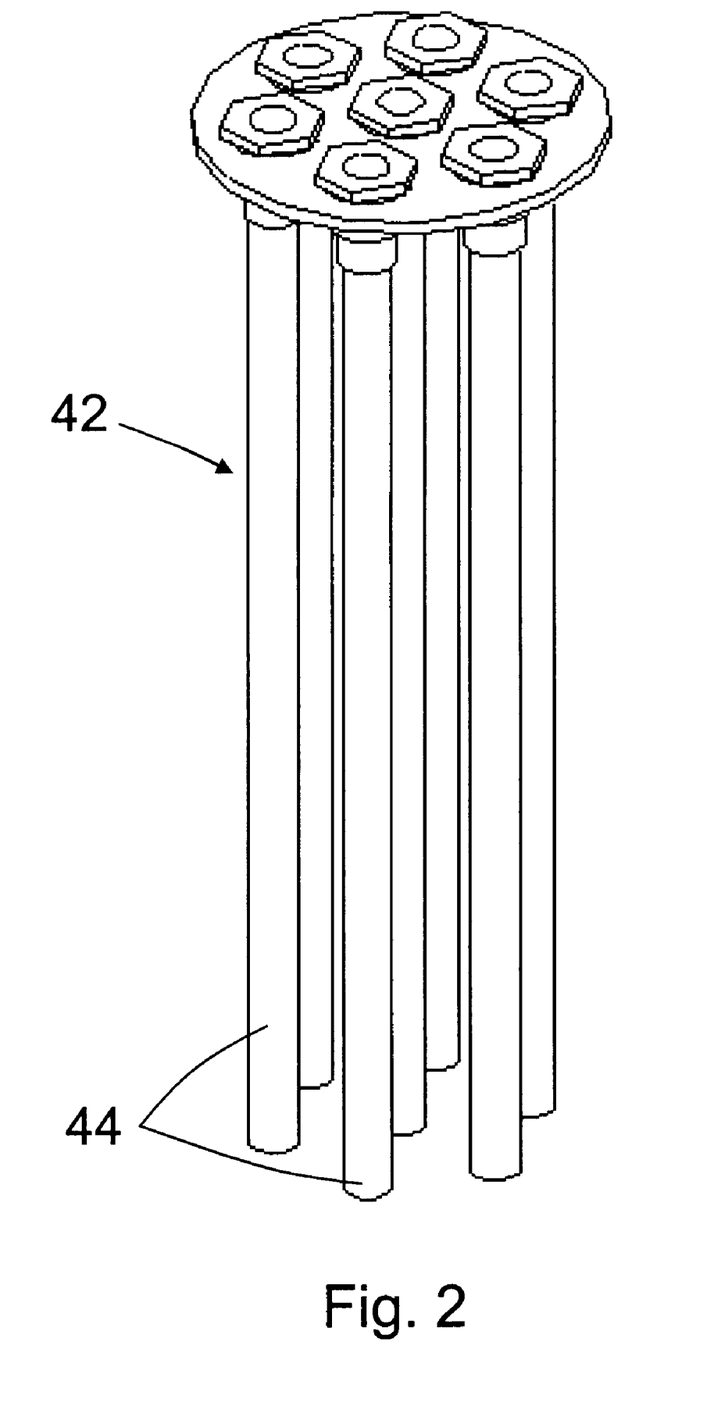
FIG. 2 is a perspective view of a membrane module.

Each filtration vessel preferably provides a mounting platform for one or more filter cassette modules. One currently preferred filter cassette module 42, shown in FIG. 2, contains seven individual sock filters 44 configured with 0.5-micron filtration membranes. Persons having ordinary skill in the art will appreciate that the number and size of filter cassette modules 42 will affect the flow capacity of the filtration vessel. For instance, if the rated flow rate is 0.9 gpm per square foot of membrane area at a differential pressure of less than 15 psi, and if each fuill cassette module has 28 square feet of membrane area, then the filter cassette is rated at 25.2 gpm. A lifting mechanism may be provided to facilitate removal and replacement of the membrane cassette modules.

The filtration membranes are periodically back-flushed with filtrate to remove solids from the membrane surface. During the back-flush procedure, the filtration vessel is taken off line and wastewater is drained from the filtration vessel via a back-flush exit stream 46 to the feed/surge tank 32. It is estimated that 400–500 gallons of water will be used during a typical back-flush cycle for a 2500 gpm filtration vessel.

The filtrate side of the filtration vessel 34 and 36 is open to the atmospheric pressure. The filtrate is collected in the top of the filtration vessel and allowed to drain into the filtrate stream 40. This volume of water provides the positive head which, when coupled with the negative head of draining the pressure side of the vessel via back-flush exit stream 42, produces enough positive pressure gradient to back-flush the filtration membrane.

After sufficient sludge settles within the bottom of the filtration vessel 34 and 36, the sludge is removed via a sludge discharge stream 48. The sludge is temporarily collected in a sludge holding tank 50. Thereafter, the sludge is directed to a filter press 52 to dewater the sludge. The filtrate is returned to the feed/surge tank 32 via a sludge filtrate stream 54. The remaining filter press solids 56 are then removed for further processing or disposal.

As shown in FIG. 1, the filtration vessels 34 and 36 can be operated in parallel to provide the required flow rate. However, the filtration vessels can be operated in series to provide primary filtration and secondary filtration. Because filtration vessels are taken off line during the back-flushing, additional filtration vessels and capacity are preferably used to ensure that the require discharge flow is maintained. An additional filtration vessel may be supplied to provide for off-line maintenance while the remainder of the system meets the flow rate requirements.

The wastewater treatment system preferably includes access to the various process streams to allow for sampling and analysis. Valves, pumps, and sensors customarily used in the art to safely control the described fluid flow to and from the filtration vessels are preferably provided. Such valves, pumps, and sensors also allow for automation of the process.

Figure 3:
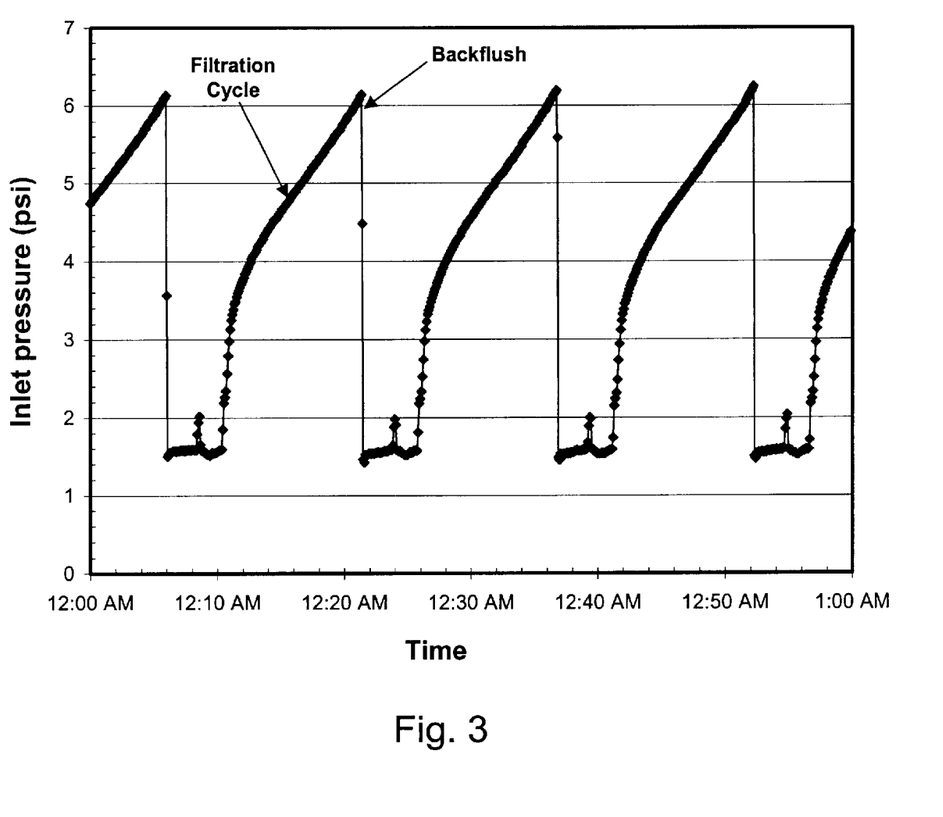
FIG. 3 is a graph of pressure vs. time showing the gradual pressure build up and membrane back-flush cycles to restore normal operating pressure.

A variety of process parameters can be monitored in real time and downloaded to a computer for further analysis or recordation. An example of real time data acquisition is illustrated in FIG. 3, which shows a real time plot of pressure vs. time illustrating the filtration and backwash cycles. In a 12-minute period, the pressure builds to approximately 6 psi, followed by membrane back-flush to slough off the built-up filter cake. Note the lack of hysteresis in the complete cycle. The data shown is a small portion of that collected over several weeks. The shape and slope of the plotted data can aid in the optimization of process parameters and can give insight into hardware operation. The data presented in FIG. 3 are based upon the results of Example 4, below.

Figure 4:
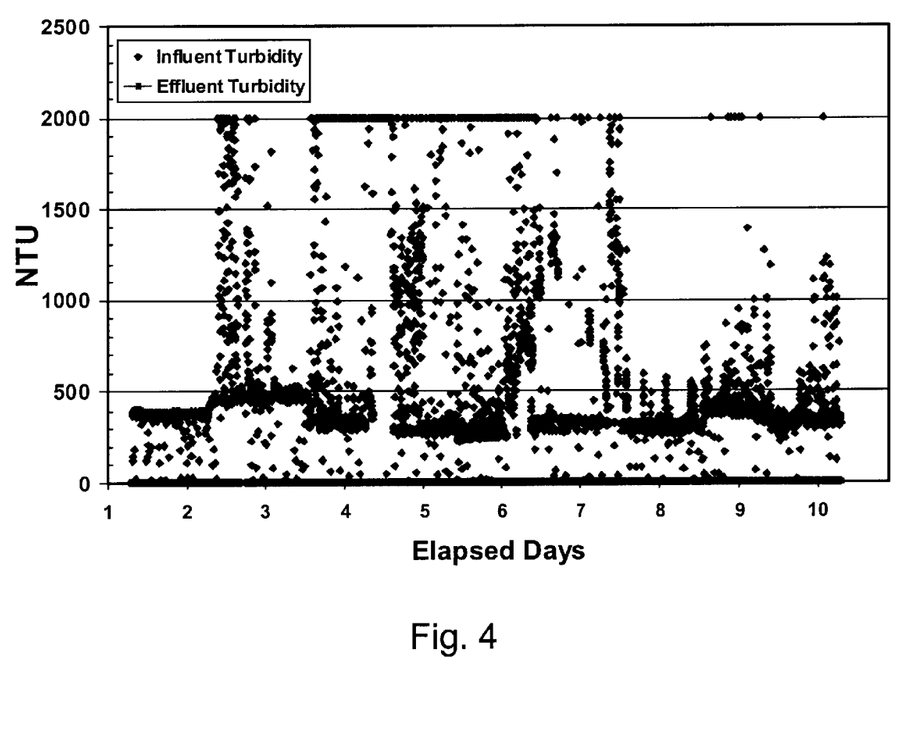
FIG. 4 is a graph of influent and effluent turbidity data collected over 10 days shows large variation in influent turbidity and stable output turbidity at sub-0.5 NTU (baseline).

Influent and effluent characteristics can be monitored in real time and downloaded to a computer for further analysis and recordation. FIG. 4 shows influent turbidity data collected in real time over a 10-day period. The data shows influent turbidity exceeding 2,000 NTU, and in parallel, the invention apparatus effluent turbidity levels as low as 0.2 NTU. This type of data acquisition allows proactive process optimization, and the necessary proof for the regulatory agencies that the wastewater remediation process is within specifications. The data presented in FIG. 4 are based upon the results of Example 4, below.

EXAMPLES

The following examples are offered to further illustrate the present invention. These examples are intended to be purely exemplary and should not be viewed as a limitation on any claimed embodiment.

Example 1

Using a 50 gallon per minute (gpm) pilot scale system, actual mine draw-down wastewater containing arsenic contaminant was processed according to the present invention. Ferric sulfate (at a ratio of 8:1 Fe:As) was used as the coagulant. DADMAC ((poly)diallyldimethylammonium chloride) and a copolymer of acrylamide and DADMAC were used at a concentration of 1 ppm (parts per million). The DADMAC was used as a 20% liquid and the DADMAC-acrylamide copolymer was used as a 10% liquid. The membrane was obtained from W. L. Gore having a Teflon® coating and a nominal pore size range of 0.5 $\mu$m. The flux rate ranged from 430 to 600 GFD at an operating pressure less than 10 psi. The results are reported below in Table 1.

TABLE 1

All Values are in Parts Per Billion (ppb)

| Time Period | Arsenic Influent | | | Arsenic Effluent | | |
|---|---|---|---|---|---|---|
| | Mean | High | Low | Mean | High | Low |
| A | 331 | 429 | 247 | 13.3 | 82 | 0 |
| B | 270 | 375 | 165 | 5.3 | 15 | 0 |
| C | 279 | 369 | 231 | 7.0 | 24 | 0 |
| D | 278 | 278 | 278 | 2.7 | 7 | 0 |
| E | 244 | 268 | 197 | 4.9 | 14 | 0 |

Example 2

At a gold mine, a 10,000 gpm high flow, low-pressure wastewater treatment system was installed to process wastewater containing 400 ppb of arsenic or greater. The wastewater treatment system used ferric hydroxide coagulation of the arsenic followed by microfiltration. The coagulant used was aqueous $Fe_2(SO_4)_3$ within a pH range of 6 to 7. The approximate dosage was 3 mole of iron to one mole of arsenic. The system included five filter vessels contain 36 membrane sock filters per cassette×24 cassettes per vessel. The 894 filter socks per vessel were either 6 or 8 ft long. The calculated flux was 1400 gal/ft²/day. The pressure ranged from 10 to 20 psig maximum. The average flow was 2,500 gpm with peaks to 5,000 gpm. The final arsenic concentration in the treated water ranged from 1 to 12 ppb, depending on ferric dose. The EPA mandated discharge limit was 50 ppb.

Example 3

At a semiconductor fabrication facility, a 5 gpm pilot system was tested for removal of fluoride from mixed acid wastewater. During a 4 day trial, the fluoride concentration varied from 50 to 330 ppm, with an average pH value of 3. After pH adjust to approximately 8 with caustic, the incoming fluoride concentration was measured by an ion specific electrode, and the wastewater was treated with a 35% solution of calcium chloride to precipitate the fluoride as calcium fluoride. The mole ratio of calcium to fluoride was 1:1. The calcium fluoride precipitate was then treated with a 38% solution of sodium aluminate at a concentration of approximately 75 ppm, and a medium molecular weight EPI-DMA organic coagulant aid at 5 ppm. The floc thus obtained was filtered at 6 to 8 psig, and yielded a fluoride concentration in the effluent that was less than 12 ppm during the 4 day trial.

Example 4

At the site of a semiconductor chip manufacturer, a 5 gpm pilot scale system was used to treat a mixed chemical mechanical polishing wastewater stream. The wastewater contained a variety of organic materials including surfactants and dispersants, which make coagulation more difficult, as well as a variety of inorganic contaminants including ammonia, silica, copper, and fluoride. During the pilot test, the wastewater stream displayed a large variance with regards to composition and concentration of the contaminant materials.

The wastewater was dosed with the following materials to produce large and easily filterable particles: 3.5 mL/min of 38% sodium aluminate, 4 mL/min of 5% EPI-DMA polymer, and 2 mL/min of 35% calcium chloride solution. Peak flux values were 600 GFD at pressures ranging from 3 to 7 psig. Some results from the wastewater trial are tabulated below:

TABLE 2

Treatment of a CMP wastewater stream (5 gpm)

| Material/ Property | Influent | Effluent (7 day avg.) | % Removal |
|---|---|---|---|
| Silica ($SiO_2$) | 1860 ppm | 1.1 ppm | 99.94% |
| Turbidity | 500–5,000 NTU | <0.3 NTU | 99.99% |
| Aluminum (Al) | 66 ppm | 2 ppm | 96.97% |
| Fluoride (F) | 28 ppm | 2.2 ppm | 92.14% |

FIG. 3, is a real time plot of pressure vs. time illustrating the filtration and backwash cycles. In a 12-minute period, the pressure builds to approximately 6 psi, followed by membrane back-flush to slough off the built-up filter cake. FIG. 4 shows influent turbidity data collected in real time over a 10-day period. The data shows influent turbidity exceeding 2,000 NTU, and in parallel, the invention apparatus effluent turbidity levels as low as 0.2 NTU.

Example 5

A 15 gpm pilot scale system was used to process wastewater containing silica. The silica was present in dissolved and colloidal silica form in the waste stream. A 38% sodium aluminate solution at a ratio of 0.45:1 Al:Si; 46% aluminum sulfate at constant dose of 45 ppm; 50% aluminum chlorohydrate at a dose of 25 ppm; and a 20% epichlorohydrin/di-methylamine (a high charged, low molecular weight cationic EPI-DMA product) at a dosage of 0.25–1.0 ppm to aid in the removal of the silica, TDS (total dissolved solids) and TSS (total suspended solids). This formed a well-defined particle. Subsequent filtering yielded very low to non-detectable effluent values of the silica and Silt Density Indices (SDI) below 3.0. The filtration membrane was a 0.5 $\mu$m polypropylene felt with a PTFE (poly (tetrafluoroethylene)) coating obtained from W. L. Gore. The membrane flux rate ranged from 500 GFD to 900 GFD at a vessel operating pressure less than 9 psi. The results are reported below in parts per million.

TABLE 3

| Time Period | Influent $SiO_2$ | Effluent $SiO_2$ |
|---|---|---|
| A | 140 | 0.443 |
| B | 160 | 0.33 |
| C | 125 | 0.37 |
| D | 153 | 0.39 |
| E | 177 | 0.36 |
| F | 165 | 0.29 |

TABLE 3-continued

| Time Period | Influent SiO$_2$ | Effluent SiO$_2$ |
|---|---|---|
| Average | 153 | 0.364 |
| Min | 125 | 0.29 |
| Max | 177 | 0.443 |

Example 6

A 15 gallon per minute (gpm) pilot scale system was used to process wastewater containing copper and lead in a combined waste flow. The copper and lead removal system employed the use of a blend of sodium thiocarbonate and sodium aluminate, which was fed at a ratio of 3.2:1 (thiocarbonate to combined metal concentration of copper and lead as measured by atomic absorption). The precipitate was flocculated with a medium charge, medium molecular weight poly(acrylamide) polymer for ease of filtering or settling. Subsequent filtering yielded a very low to non-detectable effluent values of copper and lead in the effluent. The membrane was a 1.0-micron polypropylene needled monoelement obtained from National Filter Media. The membrane flux rate was estimated to be 1000 GFD at vessel pressures from 4.5 to 6.0 psi. The results are reported below in parts per million:

TABLE 4

| Time Period | Lead | | Copper | |
|---|---|---|---|---|
| | Influent | Effluent | Influent | Effluent |
| A | 3.2 | 0.11 | 28.0 | N.D. |
| B | 2.85 | 0.14 | 32.98 | 0.032 |
| C | 3.66 | 0.109 | 21.31 | 0.045 |
| D | 2.45 | 0.15 | 23.0 | 0.023 |
| E | 3.0 | 0.10 | 28.0 | N.D. |
| F | 2.4 | 0.09 | 35.0 | N.D. |
| G | 3.8 | N.D. | 35.11 | 0.07 |
| H | 2.76 | 0.10 | 33.0 | 0.055 |
| I | 4.12 | N.D. | 27.27 | 0.11 |
| J | 2.65 | 0.12 | 24.6 | N.D. |
| Average | 3.09 | 0.09 | 28.82 | 0.0335 |
| Min | 2.4 | N.D. | 21.31 | N.D. |
| Max | 4.12 | 0.15 | 35.11 | 0.11 |

Example 7

Wastewater from two commercial textile dyeing processes was treated for the destruction and removal of dyes. The wastewater streams were first treated with an oxidizing agent to destroy the organic contaminants. Ozone and hydrogen peroxide were used in combination. Commercially available hydrogen peroxide supplied by FMC, believed to be about 45%, was first injected into the wastewater followed by in line injection of ozone. The ozone was produced via ambient air. The hydrogen peroxide had a concentration of 100 ppm and the ozone had a concentration of 200 ppm. The two oxidizing agents were mixed with in line mixers prior to injection of a chemical coagulant for particle formation. A low molecular weight cationic polymer, guanyl, was used to precipitate and flocculate the destroyed dye compounds for ease of filtering and settling. The guanyl molecular weight was between 5000 and 100,000, and was added at a dosage concentration of 50 ppm. Subsequent filtering yielded excellent removal color bodies and sufficient reduction in BOD and COD to permit discharge of the effluent to a conventional publicly owned treatment works (POTW). The membrane was a 10-micron polypropylene felt sock obtained from National Filter Media. The membrane flux rate was estimated to be about 800 GFD at vessel pressures from 5 to 8 psig. The results are reported in Table 5, below.

TABLE 5

Treatment of a Textile wastewater streams

| Material/Property | Influent (mg/L) | Effluent (mg/L) |
|---|---|---|
| BOD | 550 | 140 |
| COD | 2990 | 980 |
| TSS | 100 | 17 |
| TDS | 1390 | 1300 |
| TOC | 14 | <5 (det. limit) |
| Copper | 3.73 | <0.05 |
| Phosphorus | 46.35 | n.d. |
| Silicon | 20.58 | 14.2 |

BOD = biological oxygen demand
COD = chemical oxygen demand
TSS = total suspended solids
TDS = total dissolved solids
TOC = total organic carbon
n.d. = not detected Example 8

Wastewater having about 500 COD is treated for the destruction and removal of dyes, including residual color and turbidity. Influent turbidity is approximately 200 NTU. Ferric chloride, at a dosage of approximately 10 ppm of iron, is added to the wastewater at pH 4. Hydrogen peroxide, at a dosage of approximately 50 ppm, is also added to the wastewater and the pH is readjusted to about 4. The ferric chloride and hydrogen peroxide are allowed to react with the wastewater for a period from about ten minutes to one hour. The wastewater pH is raised to a pH of about 8, and a cationic polymer, EPI-DMA, is added to the reaction mixture. The EPI-DMA has a molecular weight of about 250,000, and it is added to the reaction mixture at a dosage of about 20 ppm. Particles having a size greater than about 50 µm are formed. The particles are filtered with a microfiltration system utilizing polypropylene felt membranes having a pore size of about 1 µm and operating at a pressure of about 7 psig. The effluent water is free of color and has a COD of 10 ppm. The effluent water turbidity is 0.01 NTU.

Example 9

Rinse waters from a poultry processing operation contain high counts of coliform bacteria, fats, and suspended solids. The pH of the rinse water is adjusted to approximately 4 and the low-density fatty components of the wastewater are removed by skimming in a 5,000 gallon tank. The water from this batch is then transferred to a second 5,000 gallon tank and is treated with 600 ppm of 45% technical grade hydrogen peroxide. After 10 minutes of stirring, 200 ppm of 45% ferric chloride solution is slowly metered in over a 20-minute period, and the pH was maintained at a value of 4. After a one-hour reaction time, the pH of wastewater is adjusted to and maintained at an approximate value of 5, and the wastewater is then treated with sufficient sodium bisulfite to neutralize the hydrogen peroxide as measured by an ORP meter. After pH adjust to approximately 8, the batch is treated with 100 ppm of a 25% branched EPI-DMA polymer coagulant to form large easily filterable particles. The particles thus obtained are filtered using the microfiltration system at a flow rate of 20 gpm and a flux of 700

GFD. The effluent thus obtained is suitable for discharge to the local POTW, and is free of pathogens. The COD is 200 ppm, and the turbidity is approximately 10 NTU.

From the foregoing, it will be appreciated that the present invention provides a process for removing contaminants from wastewater utilizing a positive physical barrier to precipitated particles. The positive separation barrier permits discharge having lower concentration limits than conventional clarifier/sand filter systems.

The apparatus for removing contaminants from wastewater occupies less space than conventional clarifier/sand filter systems. The apparatus is easily expandable.

The chemical pretreatment achieves particle formation based on size, not weight. As a result, chemical pretreatment costs are lower than those typically required for a clarifier/sand filter.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A process for removing contaminants from large volumes of wastewater comprising the steps of:
    (a) treating a wastewater stream containing the contaminant with a chemical coagulant, wherein the coagulant reacts with the contaminant to form a particulate or aggregate of particulates that has a size greater than about 10 $\mu$m;
    (b) passing the treated wastewater through a microfiltration membrane having a pore size in the range from 0.5 $\mu$m to 10 $\mu$m, wherein the treated wastewater flux rate is greater than 200 gallons per square foot of membrane per day ("GFD"), and wherein the wastewater pressure is less than 25 psig, such that the contaminant is removed from water passing through the microfiltration membrane; and
    (c) periodically back-flushing the microfiltration membrane to remove solids from the membrane surface.

2. A process according to claim 1, wherein the contaminant is selected from the group consisting of transition metals, semi-metals, and main group elements.

3. A process according to claim 1, wherein the contaminant is selected from the group consisting of the oxide, hydroxide, sulfide, and elemental forms of beryllium (Be), magnesium (Mg), aluminum (Al), silicon (Si), phosphorus (P), sulfur (S), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), arsenic (As), selenium (Se), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), indium (In), tin (Sn), antimony (Sb), tellurium (Te), barium (Ba), lanthanum (La), cerium (Ce), praseodymium (Pr), neodymium (Nd), samarium (Sm), europium (Eu), gadolinium (Gd), terbium (Th), dysprosium (Dy), holmium (Ho), erbium (Er), thulium (Tm), ytterbium (Yb), hafnium (Hf), tantalum (Ta), tungsten (W), rhenium (Re), osmium (Os), iridium (Ir), platinum (Pt), gold (Au), mercury (Hg), thallium (Tl), lead (Pb), bismuth (Bi), and fluoride ($F^-$).

4. A process according to claim 1, wherein the contaminant is selected from the group consisting of silica, alumina, phosphate, clays, and other naturally occurring and synthetic minerals.

5. A process according to claim 1, wherein the contaminant is an organic foulant in an industrial wastewater stream.

6. A process according to claim 1, wherein the contaminant is a dye.

7. A process according to claim 1, wherein the coagulant dosage is 3 to 500 ppm of active solids.

8. A process according to claim 1, wherein the back-flushing pressure is less than 5 psi.

9. A process according to claim 1, wherein the microfiltration membrane has a pore size in the range from 0.5 $\mu$m to 1 $\mu$m.

10. A process according to claim 1, wherein the wastewater pressure is from 5 to 20 psig.

11. A process according to claim 1, wherein the wastewater pH is from 2 to 11.

12. A process according to claim 1, wherein the wastewater pH is greater than 5, and the contaminant is selected from silver (Ag), arsenic (As), gold (Au), barium (Ba), cadmium (Cd), chromium (Cr), copper (Cu), mercury (Hg), nickel (Ni), lead (Pb), selenium (Se), and zinc (Zn).

13. A process according to claim 1, wherein the wastewater pH is from 5 to 8 and the contaminant is As.

14. A process according to claim 1, wherein the wastewater pH is from 5 to 11 and the contaminant is selected from alumina and silica.

15. A process according to claim 1, wherein the treated wastewater flux rate is from 200 GFD to 1500 GFD.

16. A process according to claim 1, wherein 99% of the contaminant from the wastewater is removed in a single pass through the microfiltration membrane.

17. A process according to claim 1, wherein 99.9% of the contaminant from the wastewater is removed in a single pass through the microfiltration membrane.

18. A process according to claim 1, wherein the chemical coagulant is an inorganic coagulant selected from ferric sulfate, ferric chloride, ferrous sulfate, aluminum sulfate, sodium aluminate, polyaluminum chloride, and aluminum trichloride.

19. A process according to claim 1, wherein the chemical coagulant is an organic polymeric material selected from polyacrylamides (cationic, nonionic, and anionic), EPI-DMA's (epichlorohydrin-dimethylamines), DADMAC's (polydiallydimethyl-ammonium chlorides), dicyandiamide/formaldehyde polymers, dicyandiamide/amine polymers, and natural guar.

20. A process according to claim 1, wherein the treated wastewater has a flow rate in the range from 2 gpm to 50,000 gpm.

21. A process according to claim 1, wherein the treated wastewater has a flow rate in the range from 10 gpm to 10,000 gpm.

* * * * *